(12) United States Patent
Osterlaenger et al.

(10) Patent No.: US 7,806,017 B2
(45) Date of Patent: Oct. 5, 2010

(54) BALL SCREW

(75) Inventors: Jurgen Osterlaenger, Emskirchen (DE); Dieter Adler, Herzogenaurach (DE); Manfred Kraus, Herzogenaurach (DE); Ralf Mayer, Herzogenaurach (DE); Jorg Wagner, Oberreichenbach (DE); Jean Walter, Haguenau (FR); Dietmar Rudy, Kleinbundenbach (DE)

(73) Assignee: Schaeffler KG, Herzogenaurch (DE)

( * ) Notice: Subject to any disclaimer, the term of this patent is extended or adjusted under 35 U.S.C. 154(b) by 321 days.

(21) Appl. No.: 11/572,943

(22) PCT Filed: Jul. 8, 2005

(86) PCT No.: PCT/EP2005/007392

§ 371 (c)(1),
(2), (4) Date: Apr. 12, 2007

(87) PCT Pub. No.: WO2006/012970

PCT Pub. Date: Feb. 9, 2006

(65) Prior Publication Data

US 2008/0000320 A1 Jan. 3, 2008

(30) Foreign Application Priority Data

Jul. 30, 2004 (DE) .................. 10 2004 037 123

(51) Int. Cl.
*F16H 25/22* (2006.01)
*F16C 29/06* (2006.01)
*F16C 33/38* (2006.01)

(52) U.S. Cl. ................... 74/424.82; 384/43; 384/523

(58) Field of Classification Search ............. 74/424.82, 74/424.88, 89.23; 384/51, 521, 523, 528, 384/43, 44, 45
See application file for complete search history.

(56) References Cited

U.S. PATENT DOCUMENTS

| 785,661 | A | * | 3/1905 | Chapman | ................. 384/521 |
| 785,663 | A | * | 3/1905 | Chapman | ................. 384/521 |
| 1,179,135 | A | * | 4/1916 | Oldfield | ................. 384/523 |
| 3,937,532 | A | * | 2/1976 | Fuhrmann et al. | ............. 384/44 |

(Continued)

FOREIGN PATENT DOCUMENTS

DE 10044447 4/2002

(Continued)

*Primary Examiner*—Richard W L Ridley
*Assistant Examiner*—Phillip A Johnson
(74) *Attorney, Agent, or Firm*—Volpe and Koenig, PC

(57) ABSTRACT

A ball screw is provided having a ball roller screw (1) and a screw nut (2) arranged thereon, whereby the balls (3) are arranged to endlessly circulate in a ball channel (6) defined by ball tracks (4, 5) on the ball roller screw (1) and the screw nut (2). The ball channel (6) includes a load section (7) wound about the ball roller screw (1), the beginning and end of which are endlessly connected by a load-free return section (8). A minimum of two and a maximum of four balls (3) are housed in a common ball cage (10, 22), the cage pockets (11) of which each house one of the balls (3), whereby the ball cage (10, 22) includes discs (12, 15) at the axial ends thereof and between adjacent balls (3), that engage the ball channels (4, 5), and provided on the sides thereof facing the balls (3) with a concave receptacle (14) for the balls (3).

9 Claims, 4 Drawing Sheets

U.S. PATENT DOCUMENTS

| | | | | |
|---|---|---|---|---|
| 4,844,628 | A * | 7/1989 | Knappe | 384/510 |
| 5,069,560 | A * | 12/1991 | Niedermeier et al. | 384/486 |
| 5,156,462 | A * | 10/1992 | Jacob et al. | 384/49 |
| 5,553,946 | A * | 9/1996 | Agari | 384/49 |
| 5,615,955 | A | 4/1997 | Namimatsu et al. | |
| 5,988,883 | A * | 11/1999 | Takamatu et al. | 384/45 |
| 5,993,064 | A * | 11/1999 | Teramachi et al. | 384/43 |
| 6,070,479 | A * | 6/2000 | Shirai | 74/424.88 |
| 6,247,846 | B1 * | 6/2001 | Shirai | 384/45 |
| 2002/0044703 | A1 * | 4/2002 | Itabashi | 384/45 |
| 2002/0118898 | A1 * | 8/2002 | Blaurock et al. | 384/43 |
| 2003/0231812 | A1 | 12/2003 | Hausberger et al. | |
| 2004/0057640 | A1 * | 3/2004 | Michioka et al. | 384/43 |
| 2004/0202390 | A1 * | 10/2004 | Kuo | 384/51 |
| 2005/0175264 | A1 * | 8/2005 | Kim et al. | 384/51 |
| 2006/0222275 | A1 * | 10/2006 | Kuo | 384/51 |

FOREIGN PATENT DOCUMENTS

| | | |
|---|---|---|
| DE | 10044447 A1 * | 4/2002 |
| DE | 69807796 | 5/2003 |
| DE | 69815485 | 5/2004 |
| DE | 10329098 | 1/2005 |
| EP | 0890755 | 1/1999 |
| EP | 0961045 | 5/1999 |
| EP | 1387098 | 2/2004 |
| WO | 03072966 | 9/2003 |

* cited by examiner

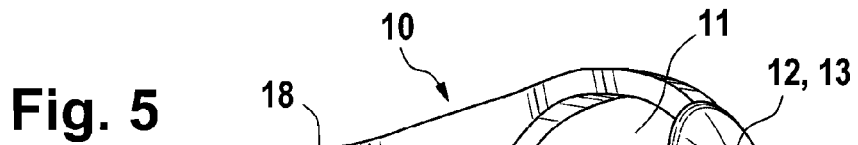
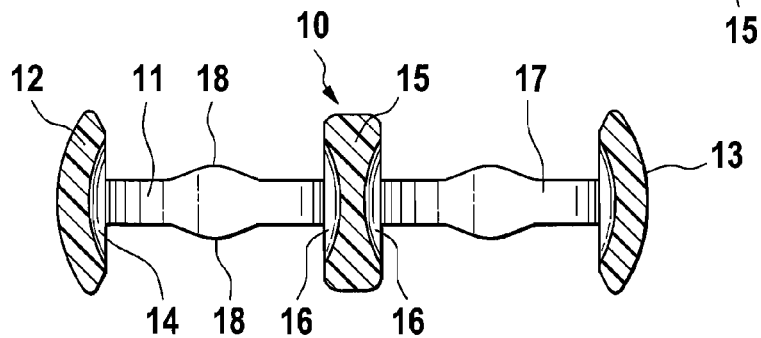
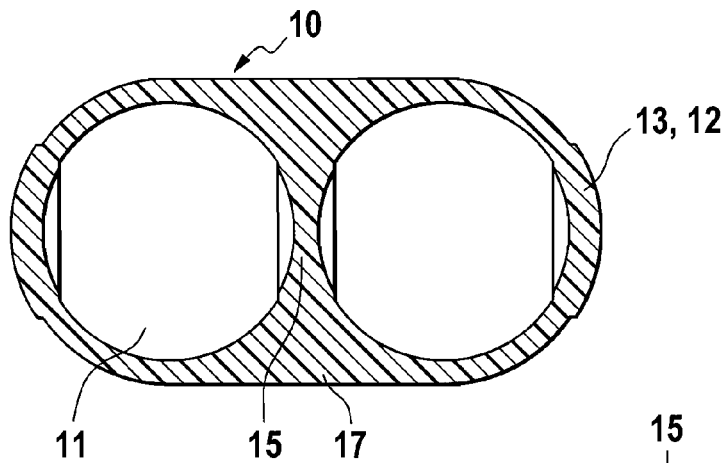

BALL SCREW

BACKGROUND

The present invention relates to a ball screw. Such ball screws convert a rotating motion into a linear motion.

From U.S. Pat. No. 6,176,149 and DE 100 44 447 A1, for example, a ball screw has become known, with a ball roller screw and a screw nut arranged thereon. Balls are arranged so that they can circulate endlessly in an endless ball channel limited by helical, spiral ball tracks of the ball roller screw and the screw nut. The ball channel comprises a load section wound about the ball roller screw, whose beginning and end are endlessly connected to each other by a load-free return section. In the ball screw disclosed by U.S. Pat. No. 6,176,149, a plurality of spacers having concave surfaces are arranged between adjoining balls to reduce friction between adjoining balls. However, in this configuration, the individual spacers do not restrict the balls' movement along the ball channel and ball clogging can still occur. In the ball screw disclosed by DE 100 44 447 A1, two balls are housed in a common ball cage, whose cage pockets each house one of the balls. The ball cage is formed of a flat, disc-shaped base with oval outer contours, in which two circular recesses form the pockets for the balls. The pocket walls are slightly concave and enclose a portion of the ball circumference on both sides of an equatorial plane, so that the balls are held in these pockets so that they cannot be lost. Due to the minimal wrap-around by means of the concave pocket walls, a pronounced dip by the balls in these cage pockets is set. This dip—or also pocket play—could be reduced in that the ball cage and thus the ball wrap-around have a thicker configuration. However, thicker ball cages are associated with other disadvantages: the ball cage extends along the ball channel. In this extension direction, the ball cage has webs, which are arranged parallel to the ball tracks but outside of these ball tracks. The radial spacing between the outer periphery of the ball roller screw and the inner periphery of the screw nut must be constructed at least as large as the thickness of this web, so that the ball screw is functional. If the ball cage has a thicker construction, that is, if the web is also thicker, then this leads to the result that this radial spacing increases. The ball screw then has a larger structure. Another problem presents itself in the region of the return section. In the return section, typically there is a groove, in which this web runs. If this web now has a thicker construction, then the groove and thus the return section must have a larger construction.

SUMMARY

The objective of the present invention is to provide a ball screw according to the features of the preamble of claim 1, in which the ball play in the ball cage is reduced, without causing the described disadvantages.

According to the invention, this objective is met in that the ball cage has discs at its axial ends and between adjacent balls, each of which engages in the ball tracks and are provided with a concave receptacle for the balls on their sides facing the balls. Consequently, for the ball screw according to the invention, these discs extend into the ball track cross section. Thus, the ball wrap-around is increased significantly. The ball play is simultaneously considerably reduced due to the increased ball wrap-around. The radial spacing between the outer periphery of the ball roller screw and the inner periphery of the screw nuts remains unchanged, because the cage web can also remain unchanged in its thickness.

Preferably, two balls are arranged in one ball cage. The invention is likewise suitable, however, in an advantageous manner for ball cages with at most four pockets, in each of which is housed a ball so that it cannot be lost.

In the ball screw, there is a plurality of such ball cages arranged one behind the other in a line. To guarantee that touching ball cages cannot be interlocked, an improvement according to the invention provides that the discs lying on the ends of the ball cage are constructed on their opposing sides as convex bumpers. Consequently, two adjacent ball cages both have these convex bumpers on their facing sides, which guarantees an interlocking-free passage through the ball channel.

During a complete cycle of the ball cages through the ball channel, pivoting motions are made between adjacent ball cages. The convex bumpers of the two ball cages touch in an approximately point-shaped contact. This contact point of the two bumpers wanders as a function of a pivot position of the two ball cages relative to each other along the convex bumper surface. These convex bumpers are adjusted to each other so that an interlocking-free passage through the ball channel is guaranteed. The bumpers can also be adjusted to each other so that during the wandering of the contact point, there are no or only negligible relative motions in the direction of the ball channel between the two ball cages.

The already mentioned web is arranged on at least one longitudinal side of the ball cage, wherein all of the discs are connected by the web. Such ball cages are preferably made from plastic in an injection-molding process. The plastic can preferably have a flexible, smooth, low-friction, and noise-damped construction. If only one web is provided, the pockets can have an open construction and the ball cage becomes even more flexible. That is, the balls are not enclosed over a complete equatorial circumference. However, two webs can also be provided, wherein the other web is arranged on the other longitudinal side. In this case, the balls are completely enclosed about an equator.

According to another improvement of the invention, the web can be provided on sides facing away from each other with a guide cam for guiding the ball cage, wherein one side is arranged radially outside of the screw nut and the other side is arranged radially inside the ball roller screw. These guide cams become important especially in the return section. In the return section, the balls circulate without loading. Therefore, in the return section the balls can contact walls defining the return section and can cause undesired noise. This noise can now be prevented such that, on one hand, the ball play is considerably reduced by the discs according to the invention and, on the other hand, the return section is provided with guide surfaces for guiding the cage web. In this way, in the return section, it can be guaranteed that the ball cage is guided exclusively on these guide surfaces. Consequently, the balls cannot contact the walls defining the return section despite a small play in the ball cage, but instead pass through the return section without touching the walls.

These guide surfaces can be preferably constructed on facing groove walls of a guide groove.

For reducing the friction between the balls and the ball cage, a roller body, which is in rolling contact with the two balls of a ball cage, can be arranged between the two balls.

Preferably, the rotational axis of this intermediate roller body lies in a common plane with the rotational axes of the balls.

BRIEF DESCRIPTION OF THE DRAWINGS

The invention is described in more detail below with reference to three embodiments shown in a total of eleven figures. Shown are.

DETAILED DESCRIPTION OF THE PREFERRED EMBODIMENTS

Figure 1:
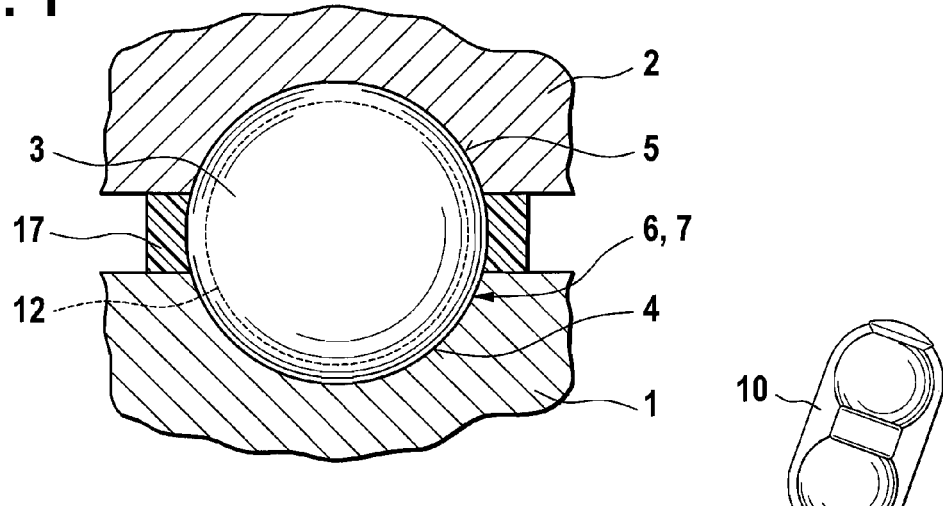
FIG. 1 a partial cross sectional view through a ball screw according to the invention, FIG. 2 balls arranged in ball cages for the ball screw according to the invention, FIG. 3 the ball cage shown in FIG. 2 in the return section of the ball screw according to the invention, FIG. 4 a view of the return section shown in FIG. 3, FIG. 5 a perspective view of an individual ball cage of the ball screw according to the invention, FIG. 6 the ball cage from FIG. 5 in a longitudinal section view, FIG. 7 the ball cage according to FIG. 5 in another longitudinal section view, FIG. 8 a perspective view of a modified ball cage of another ball screw according to the invention, FIG. 9 a partial cross-sectional perspective view through the return section according to FIG. 3, FIG. 10 a top view on the longitudinal section according to FIG. 9, FIG. 11 a partial section in the return section of another ball screw according to the invention, and FIG. 12 a cross-sectional view of a prior art ball screw.
Figure 2:
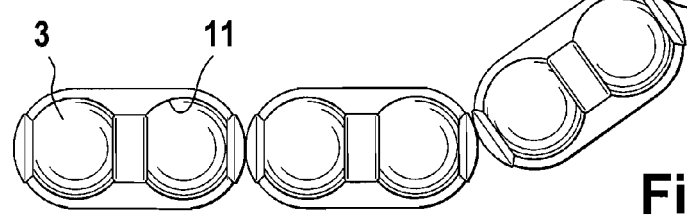
Figure 3:
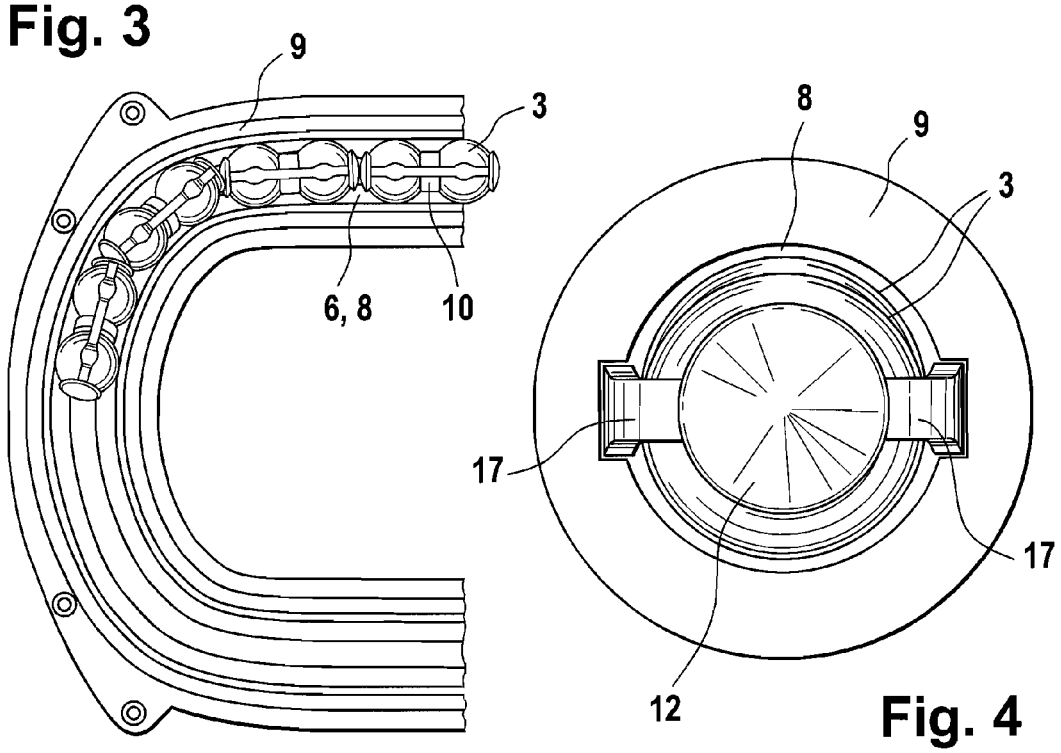
Figure 4:
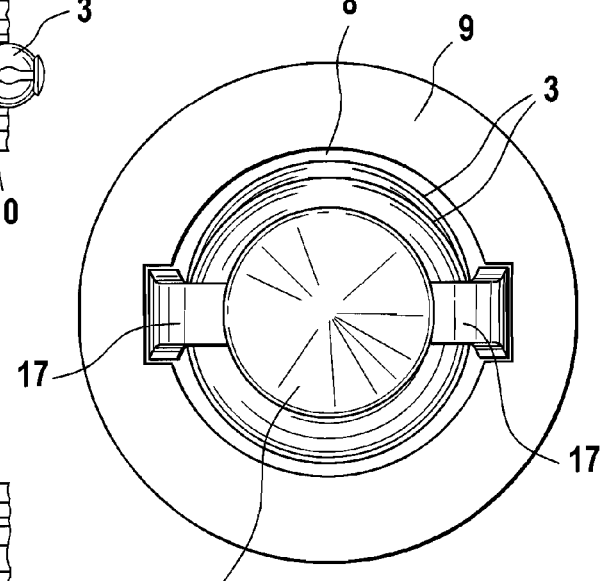

The ball screw according to the invention shown in FIGS. 1 to 7 and FIGS. 9 and 10 has a ball roller screw 1 and a rotatable screw nut 2 arranged thereon. Balls 3 are arranged so that they can circulate endlessly in an endless ball channel 6 limited by ball tracks 4, 5. The ball channel 6 has a load section 7, which is wound about the ball roller screw 1 and in which the balls 3 are arranged on the ball tracks 4, 5 so that they can roll under loading. The beginning and end of the load section 7 are connected to each other endlessly by a load-free return section 8. The return section 8 is here constructed on a longitudinally divided tube 9, whose one half is shown in FIG. 3. Furthermore, there is a plurality of ball cages 10 arranged one behind the other in the ball channel 6. In each ball cage 10, two balls 3 are housed in ball pockets 11 so that they cannot be lost. Several of these ball cages 10 arranged one behind the other are shown in FIG. 2.

FIG. 5 shows in perspective view one of these ball cages 10. The ball cage 10 has a disc 12 on each of its two axial ends. These two discs 12 are convex on their sides facing away from each other and form bumpers 13. The sides of these discs 12 facing each other are concave and form receptacles 14 for the balls 3. The discs 12 enclose with the receptacles 14 a portion of the ball periphery on both sides of an equatorial plane, so that the balls 3 are held in the cage pockets 11 with little play so that they cannot be lost. Another disc 15 is arranged between the two cage pockets 11 of the ball cage 10. The sides of the discs 15 facing the discs 12 are likewise concave and form receptacles 16 for the balls 3.

The bumpers and the receptacles are to be seen especially clearly in FIG. 6.

Both longitudinal sides of the ball cage 10 are formed by webs 17, which connect the discs 12, 15 to each other. The ball cage 10 is presently made from plastic in an injection-molding process, wherein the webs 17 and the discs 12, are integrally connected to each other.

It can be noted from FIG. 1 that the discs—here discs 12—fill up the majority of the ball channel 6. The discs 12, 15 thus engage in the ball tracks 4, 5 of the ball roller screw 1 and the screw nut 2. It can be further inferred from FIG. 1 that the webs 17 have a very flat construction in comparison with the discs 12, 15. The ball cage 10 is guided in the load section 7 via the webs 17 on the inner periphery of the screw nut 2 and on the outer periphery of the ball roller screw 1.

It can be noted from FIGS. 3, 5, 6 that each web 17 is provided with two guide cams 18 on web sides facing away from each other. These guide cams 18 are used for guiding the ball cage 10 in the ball channel 6. The guide cams 18 gain special meaning in the return section 8.

Figure 9:
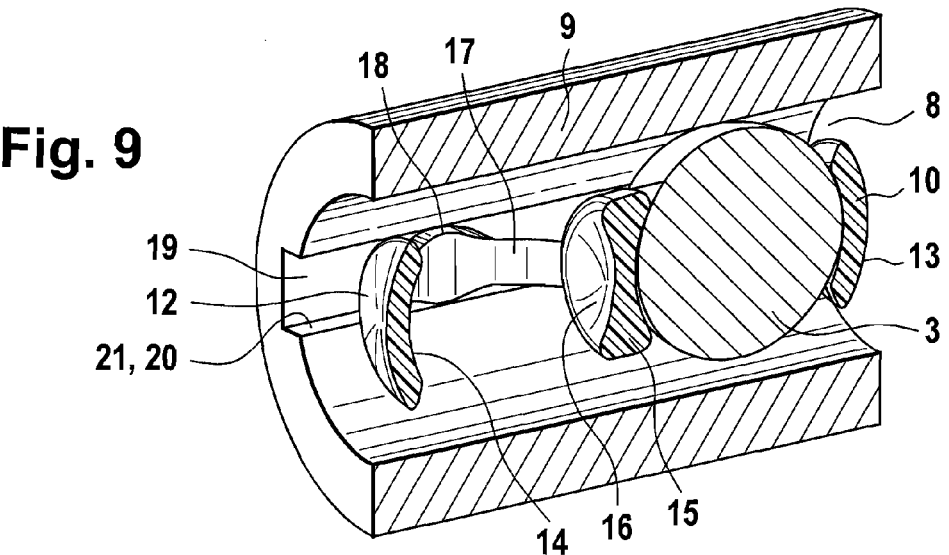

FIG. 9 shows in perspective view a partial section through the return section 8. In the return section 8 there are two guide grooves 19, of which one is shown. Facing groove walls 20 of the guide groove 19 form guide surfaces 21 for the ball cage 10. It can be noted from FIG. 9 that the web 17 engages with its guide cams 18 in the guide groove 19. The guide cams 18 contact the guide surfaces 21 of the guide groove 19. In the return section 8, the ball cage 10 is guided without a problem. The ball channel 6 is provided within the return section 8 with a diameter that is sufficiently large that the balls 3 are not in contact with the tube 9. The enclosing of the balls 3 with the receptacles 14, 16 of the discs 12, 15 over a large ball periphery section guarantees only little play or ball dip in the ball cage 10. In this way, rattling noises in the region of the return section are ruled out due to the absence of the balls striking the walls of the return section.

FIG. 8 shows a modified ball cage 22. This differs from the ball cage described farther above in that instead of two webs only one web 17 is constructed. Consequently, it is sufficient to construct only one guide groove 19 in the return section 8.

Figure 10:
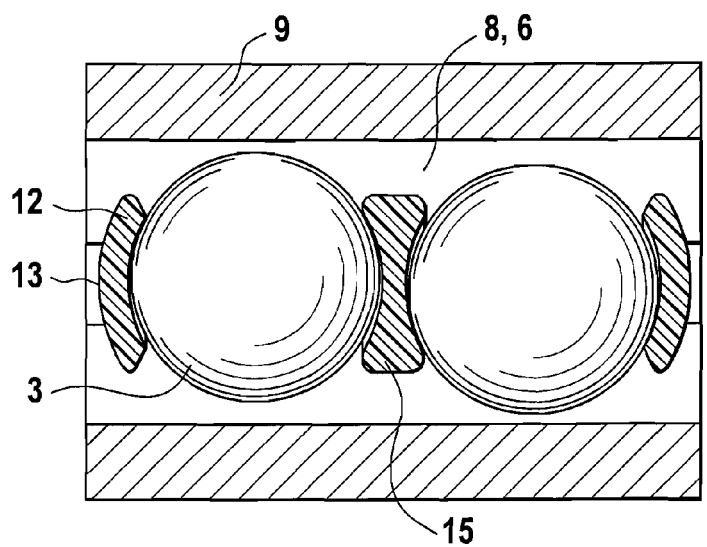

It can be noted from FIG. 10 that in the return section 8, the balls 3 are arranged with a spacing relative to the tube wall, which defines the ball channel 6 in the region of the return section.

Figure 11:
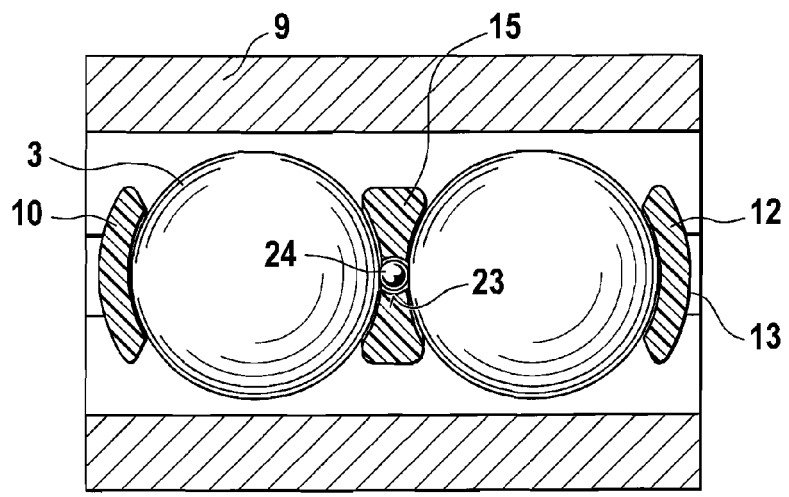
Figure 12:
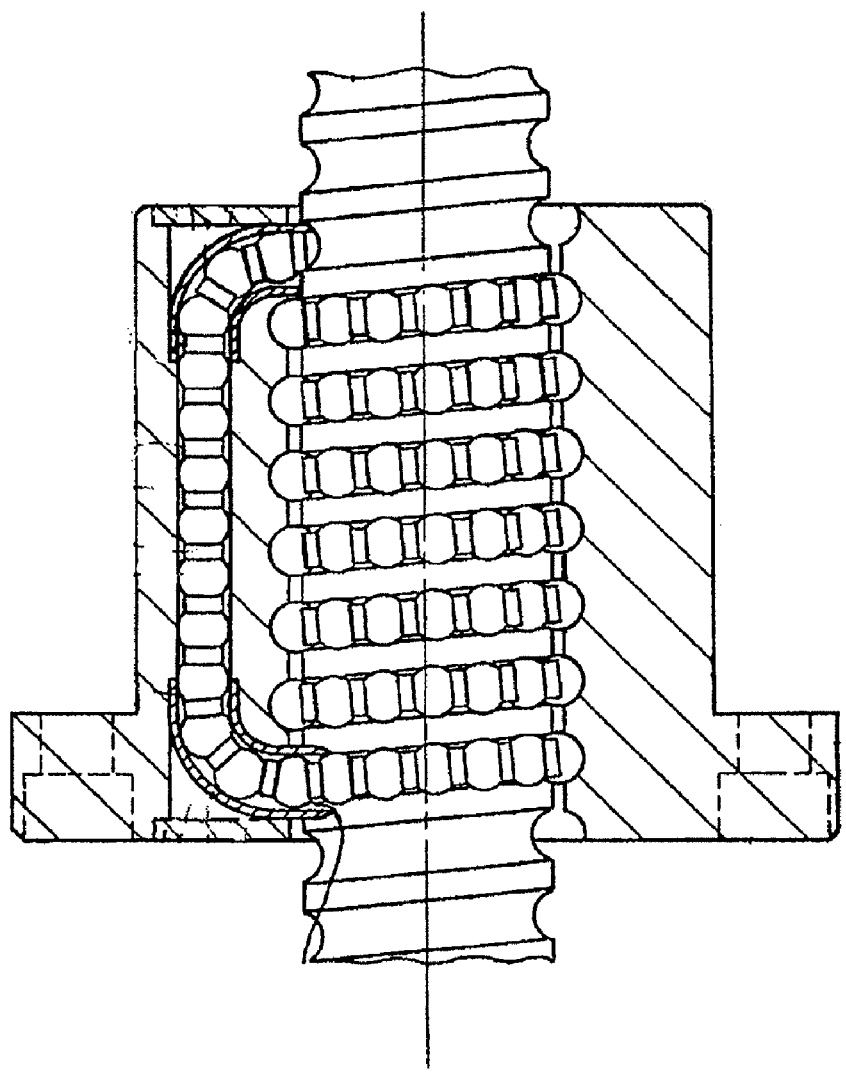

FIG. 11 shows in a longitudinal section like that of FIG. 10, a section of another ball screw according to the invention. In contrast to the ball screw according to the invention described previously, here the disc 15 is provided with a pocket 23, in which a roller body 24 is arranged so that it can rotate. This roller body 24 stands in rolling contact with the two adjacent balls 3. The rotational axes of the balls 3 and the roller body 24 lie in a common plane. In this way, the sliding friction of the balls 3 is reduced with the ball cage 10.

REFERENCE NUMBERS

1 Ball screw
2 Screw nut
3 Ball
4 Ball track
5 Ball track
6 Ball channel
7 Load section
8 Return section
9 Tube
10 Ball cage
11 Cage pocket
12 Disc
13 Bumper
14 Receptacle
15 Disc
16 Receptacle 17 Web
18 Guide cam
19 Guide groove
20 Guide wall
21 Guide surface
22 Ball cage
23 Pocket
24 Roller body

The invention claimed is:

1. Ball screw comprising a ball roller screw and a screw nut arranged thereon, wherein balls are arranged to circulate endlessly in an endless ball channel limited by ball tracks of the ball roller screw and the screw nut, the ball channel has a load section, which is wound about the ball roller screw and has a beginning and end that are connected to each other endlessly by a load-free return section, a plurality of common ball cages, each housing at least two and at most four balls in separate cage pockets that each house one of the balls, the ball cages have discs which engage in the ball tracks at axial ends thereof and between adjacent ones of the balls, the discs include a concave receptacle for the balls on sides thereof facing the balls, and two of the discs located at the ends of the ball cages include three-dimensionally partially ball-shaped convex bumpers on sides thereof facing away from each other, each of the bumpers is adjacent to one of the bumpers at an end of another one of the ball cages during operation.

2. Ball screw according to claim 1, wherein a web, which connects all of the discs to each other, is arranged on at least one longitudinal side of the ball cage.

3. Ball screw according to claim 2, wherein the ball cage is produced from plastic in an injection-molding process.

4. Ball screw according to claim 2, wherein the web is provided with a guide cam for guiding the ball cage located on each side thereof facing away from each other.

5. Ball screw according to claim 2, wherein the screw nut is provided in the return section that extends along the ball tracks with guide grooves for guiding the ball cage, and the cage web is arranged between the guide surfaces of the guide grooves.

6. Ball screw according to claim 5, wherein the guide surfaces are constructed on facing groove walls of the guide groove.

7. Ball screw according to claim 5, wherein in the return section, the balls are held in the cage pockets of the ball cages and do not contact the ball channel.

8. Ball screw according to claim 1, wherein a roller body, which is in rolling contact with the two balls, is arranged in a pocket defined in the disc between the balls in the ball cage.

9. Ball screw according to claim 8, wherein a rotational axis of the roller body is arranged in a common plane with rotational axes of the balls.

* * * * *